(12) United States Patent
Kotani et al.

(10) Patent No.: US 6,247,131 B1
(45) Date of Patent: Jun. 12, 2001

(54) INFORMATION MANAGEMENT METHOD AND RECORDING MEDIUM

(75) Inventors: Seigo Kotani; Makoto Yoshioka; Keiichi Murakami; Hideyuki Hirano; Takehiko Hayashi; Shinichi Yoshimoto, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/943,148

(22) Filed: Oct. 3, 1997

(30) Foreign Application Priority Data

Mar. 14, 1997 (JP) .................................................. 9-061568

(51) Int. Cl.[7] .................................................. G06F 12/14
(52) U.S. Cl. .................................................. 713/200
(58) Field of Search .............................. 714/48; 713/200, 713/202; 380/4, 3, 201, 202, 203; 709/229, 9; 395/701, 704, 705, 706, 712

(56) References Cited

U.S. PATENT DOCUMENTS

| | | | |
|---|---|---|---|
| 4,866,769 | * 9/1989 | Karp ......................................... | 380/4 |
| 5,034,980 | * 7/1991 | Kubota ..................................... | 380/4 |
| 5,058,162 | * 10/1991 | Santon et al. ........................... | 380/25 |
| 5,155,680 | * 10/1992 | Wiedemer ................................ | 380/4 |
| 5,327,563 | * 7/1994 | Singh ....................................... | 380/4 |
| 5,513,260 | * 4/1996 | Ryan ........................................ | 380/3 |
| 5,568,550 | * 10/1996 | Ur ............................................. | 380/4 |
| 5,666,411 | * 9/1997 | McCarty ................................... | 380/4 |
| 5,719,937 | * 2/1998 | Warren et al. ........................... | 380/4 |
| 5,757,908 | * 5/1998 | Cooper et al. ........................... | 380/4 |
| 5,758,069 | * 5/1998 | Olsen ....................................... | 380/4 |
| 5,765,152 | * 6/1998 | Erickson .................................. | 380/4 |
| 5,787,428 | * 7/1998 | Hart .......................................... | 707/9 |
| 5,805,699 | * 9/1998 | Akiyama et al. ........................ | 380/4 |
| 5,881,152 | * 3/1999 | Moos ....................................... | 380/4 |
| 5,881,287 | * 3/1999 | Mast ........................................ | 395/701 |

OTHER PUBLICATIONS

CD–Recordable Hand Book Parker et al., 1996.*

* cited by examiner

Primary Examiner—James P. Trammell
Assistant Examiner—Pierre Elisca
(74) Attorney, Agent, or Firm—Staas & Halsey LLP

(57) ABSTRACT

A program ID is provided for each authoring program, the program ID of the authoring program is copied to the program ID whenever the authoring program processes contents, and contents ID are newly generated and provided also for each contents. Thereby, the management of an authoring program or contents such as assuring of copyright, preventing of alteration, or maintaining of security is simplified.

45 Claims, 12 Drawing Sheets

INFORMATION MANAGEMENT METHOD AND RECORDING MEDIUM

BACKGROUND OF THE INVENTION

The present invention relates to a method for managing information generated by a computer system and a software program serving as information for generating information by a computer system and a recording medium.

In accordance with the advancement of recent computer arts, a lot of various digitized pieces of information has circulated through electronic networks. Conventionally, a software program (hereafter referred to as authoring program) for processing file data (hereafter referred to as contents) serving as information unit to be processed by a computer system is installed from a recording medium such as a CD-ROM or a flexible disk or down-loaded on-line through a network, and captured by the computer system, and then each of the contents is processed by the program.

In the above state, management of authoring programs and contents such as assuring of copyright, preventing of alteration, or maintaining of security requires a technique basically different from conventional prevention of copying of paper-based information printed on paper or storage of data in a lockable place. Contents have been enciphered so far for security. However, enciphering of contents is not generalized yet and therefore, it can be hardly said that this is popular.

By making it possible to securely perform the above-described enciphering of contents, information management at each user level may be possible to a certain extent. However, processing of enciphering and operation for decoding are troublesome for each user. Moreover, to make the above mentioned widely circulate through the society, universal enciphering algorithm is necessary. However, to meet the necessity, the enciphering algorithm must be opened to the public. Therefore, this causes various problems.

The present invention is made to solve the above problems and its object is to provide an information management method and a recording medium making it possible to identify each authoring program and contents by providing unique ID for each authoring program and contents.

BRIEF SUMMARY OF THE INVENTION

The present invention makes it possible to identify each authoring program and contents circulating through the society by providing an identifier (unique ID) for each authoring program, transferring the unique ID of the authoring program processing each contents to each contents when handling contents by using the authoring program, and moreover providing each contents with a unique ID. It is an object of the present invention to easily manage information by the above technique and easily apply the technique to various fields including copyright protection and security.

In the case of the present invention, each authoring program and contents have a unique ID. Therefore, if the authoring program or contents is or are copied, the unique ID is also copied. Therefore, whether the authoring program or contents is or are illegally owned can be immediately decided by referring to the unique ID of the authoring program or contents. That is, it is possible to specify the environment in which the authoring program is installed or the contents is created in accordance with the unique ID of the authoring program or contents. Therefore, by comparing the environment with the environment at the present, it is possible to decide whether the authoring program or contents is or are illegally obtained. Moreover, when unique IDs are changed after obtaining an authoring program or contents through copying, it is impossible to use the authoring program or make an access to the contents. Therefore, copying of the authoring program or contents does not make sense.

In the case of the first aspect of an information management method of the present invention, when a recording medium in which a software program for creating and/or processing a file data is recorded is manufactured, a unique identifier generated so as to be read together with the software program is recorded in the recording medium.

Moreover, in the case of the first aspect of an information management method of the present invention, when a recording medium in which a software program for creating and/or processing a file data is recorded is manufactured, a unique identifier generated so as to be read together with the software program is recorded in the recording medium and thereby, making it possible to identify each software program when the unique identifier is installed into a computer system.

Furthermore, in the case of the first aspect of a recording medium of the present invention, a unique identifier generated so as to be read together with a software program for creating and/or processing a file data is recorded in a recording medium in which the software program is recorded.

Furthermore, in the case of the first aspect of a recording medium of the present invention, a unique identifier generated so as to be read together with a software program for creating and/or processing file data is recorded in the recording medium in which the software program is recorded and therefore, it is possible to identify each software program when the identifier is installed into a computer system.

Furthermore, in the case of the second aspect of an information management method of the present invention, when an authorization for installation into a computer system is given from an on-line-connected management center, installation into the computer system can be made. Therefore, when a software program for creating and/or processing a file data is installed into the computer system, a unique identifier generated by the management center so as to be read together with the software program is installed into the computer system.

In the case of the second aspect of an information management method of the present invention, when an authorization for installation into a computer system is given from an on-line-connected management center, installation into the computer system can be made. Therefore, when a software program for creating and/or processing a file data is installed into a computer system, a unique identifier generated so as to be read together with the software program is generated by the management center and installed into the computer system. Therefore, when the software program is installed into the computer system, it is possible to identify each software program.

Moreover, in the case of the second aspect of a recording medium of the present invention, a unique identifier generated by a management center so as to be read together with a software program for creating and/or processing a file data is recorded in a recording medium in which the software program is recorded because an authorization for installation of the software program into a computer system is given from a on-line-connected management center and thereby, the software program is installed into the computer system.

Furthermore, in the case of the second aspect of a recording medium of the present invention, because a unique identifier generated by a management center so as to be read together with a software program for creating and/or processing a file data is recorded in a recording medium in which the software program is recorded because an authorization for installation of the software program into a computer system is given from a on-line-connected management center and thereby, the software program is installed into the computer system. Therefore, when the software program is installed into the computer system, it is possible to identify each software program.

In the case of the third aspect of an information management method of the present invention, when a software program for creating and/or processing a file data is installed into a computer system, a unique identifier to be read together with the software program is generated in accordance with the information intrinsic to the computer system and installed into the computer system.

Moreover, in the case of the third aspect of an information management method of the present invention, when a software program for creating and/or processing a file data is installed into a computer system, a unique identifier to be read together with the software program is generated in accordance with the information intrinsic to the computer system and installed into the computer system. Therefore, when the unique identifier is installed into the computer system, it is possible to identify each software program.

Furthermore, in the case of the third aspect of a recording medium of the present invention, a unique identifier generated to be read together with a software program for creating and/or processing a file data is generated in accordance with the information intrinsic to a computer system and recorded in the recording medium in which the software program is recorded when the software program is installed into the computer system.

In the case of the third aspect of a recording medium of the present invention, because a unique identifier generated to be read together with a software program for generating and/or processing a file data is generated in accordance with the information intrinsic to a computer system and recorded in the recording medium in which the software program is recorded when the software program is installed into the computer system, it is possible to identify each software program when the unique identifier is installed into the computer system.

Moreover, in the case of the fourth aspect of an information management method of the present invention, when a software program for creating and/or processing a file data is installed into a computer system, optional information is installed into the computer system from an external unit as a unique identifier generated so as to be read together with the software program.

Furthermore, in the case of the fourth aspect of an information management method of the present invention, because, when a software program for creating and/or processing a file data is installed into a computer system, optional information is installed into the computer system from an external unit as a unique identifier generated so as to be read together with the software program, it is possible to identify each software program when the unique identifier is installed in the computer system.

Furthermore, the above identifier of the fourth aspect of an information management method of the present invention is generated in accordance with the information previously provided for one of a plurality of hardware (specifically, CPU and/or hard disk) constituting a computer system.

Furthermore, in the case of the fourth aspect of an information management method of the present invention, because the above identifier is generated in accordance with the information previously provided for one or a plurality of hardware (specifically, CPU and/or hard disk) constituting a computer system, it is possible to specify a computer system in which a software program is installed.

Furthermore, in the case of the fourth aspect of a recording medium of the present invention, optional information inputted to a computer system from an external unit is recorded as a unique identifier in the recording medium in which a software program for creating and/or processing a file data is recorded when the software program is installed into the computer system.

Furthermore, in the case of the fourth aspect of a recording medium of the present invention, because optional information inputted to a computer system from an external unit is recorded as a unique identifier in the recording medium in which a software program for creating and/or processing a file data is recorded when the software program is installed into the computer system, it is possible to identify each software program when the unique identifier is installed into the computer system.

Furthermore, the above identifier of the fourth aspect of a recording medium of the present invention is generated in accordance with the information previously provided for one or a plurality of hardware (specifically, CPU and/or hard disk) constituting a computer system.

Furthermore, in the case of the fourth aspect of a recording medium of the present invention, because the above identifier is generated in accordance with the information previously provided for one or a plurality of hardware (specifically, CPU and/or hard disk) constituting a computer system, it is possible to specify a computer system in which a software program is installed.

Furthermore, in the case of the aspects of information management methods and recording media of the present invention, inspection information according to a predetermined algorithm is attached to the above unique identifiers and the unique identifier provided for the software program concerned and an inspection program for inspecting the identity with the inspection information are attached in or accompanying the software program concerned.

In the case of the aspects of information management methods and recording media of the present invention, the identity between the above unique identifiers provided for software programs and inspection information is inspected by an inspection program. Therefore, it is automatically inspected whether the identifier of a software program is altered.

Furthermore, in the case of the fifth aspect of an information management method of the present invention, when file data is created or existing data file is processed by a software program, the unique identifier provided for the software program is copied to the file data concerned.

Furthermore, in the case of the fifth aspect of an information management method of the present invention, when file data is created or existing file data is processed, it is possible to identify the software program handling the file data.

Furthermore, in the case of the sixth aspect of an information management method of the present invention, when file data is created by a software program, the unique identifier provided for the software program is copied to the data file and a newly-generated unique identifier is provided for the file data.

Furthermore, in the case of the sixth aspect of an information management method of the present invention, when existing file data is processed, it is possible to identify the software program handing the file data and identify each file data.

Furthermore, in the case of the sixth aspect of an information management method of the present invention, a unique identifier provided for file data by a software program includes the type and/or name of the software program.

Furthermore, in the case of the sixth aspect of an information management method of the present invention, the type and/or name of the software program creating file data is and/or are easily clarified.

Furthermore, in the case of the seventh aspect of an information management method of the present invention, inspection information according to a predetermined algorithm is attached to a unique identifier to be provided for file data and moreover, an inspection program for inspecting the identity between the unique identifier to be provided for the file data and the inspection information in or accompanying the software program creating and/or processing the file data.

Furthermore, in the case of the seventh aspect of an information management method of the present invention, because the identity between the above unique identifier to be provided for file data and inspection information is inspected by the inspection program, it is automatically inspected whether the identifier of the file data is altered.

The above and further objects and features of the invention will more fully be apparent from the following detailed description with accompanying drawings.

DESCRIPTION OF THE PREFERRED EMBODIMENTS

The present invention is described below by referring to the accompanying drawings showing the preferred embodiments.

Figure 1:
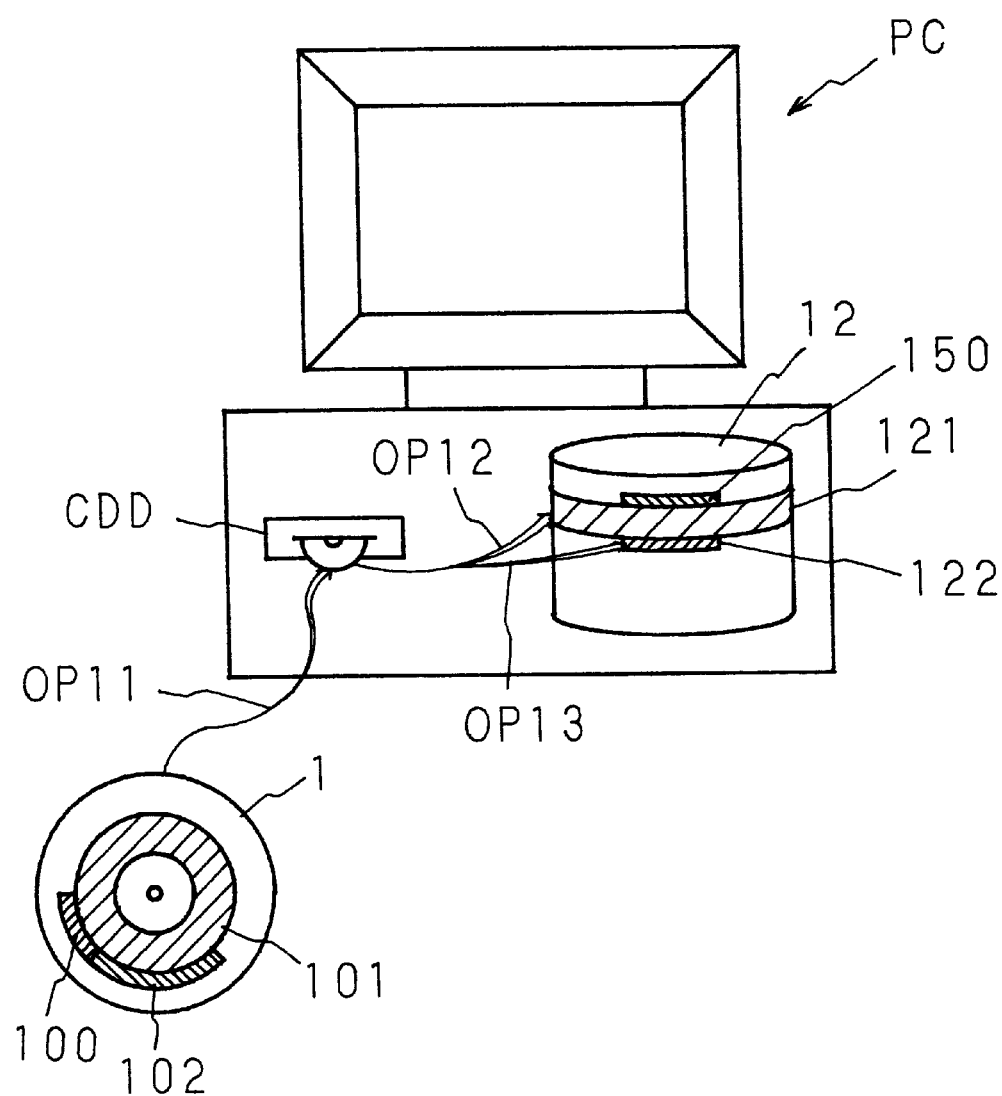
FIG. 1 is a schematic view for explaining the first embodiment of an information management method and recording medium of the present invention.

FIG. 1 is a schematic view for explaining the first embodiment of an information management method and recording medium of the present invention.

In FIG. 1, a case in which a manufacturer provides a unique ID for an authoring program is shown. When the manufacturer manufactures a recording medium (e.g. CD-ROM, flexible disk, or ROM cartridge), he records an electronically-readable unique ID (hereafter referred to as program ID) in the recording medium. For example, as shown by the schematic view in FIG. 1, when the manufacturer records an authoring program 101 in a CD-ROM 1 serving as a recording medium so as to be electronically readable, he also records a program ID 102 so as to be electronically readable.

Reference numeral 100 denotes an inspection program and its details are described later. Though not illustrated in FIG. 1, inspection information 1020 is attached to the program ID 102 serving as the unique ID of the authoring program as shown in schematic view in FIG. 2. In the case of the inspection information 1020, the algorithm for generating the information 1020 is held by the manufacturer of an authoring program 121 or the authoring program 121 itself. Therefore, any outsider cannot know the algorithm.

When a user obtains the CD-ROM 1 thus manufactured, puts into the CD-ROM 1 to a CD-ROM drive CDD of his or her computer system such as a personal computer PC (OP11), and installs the authoring program 101 into the personal computer PC, it is a matter of course that the authoring program 101 recorded in the CD-ROM 1 is electronically read and installed into the personal computer PC (OP12). Moreover, the program ID 102 is electronically read from the CD-ROM 1 at the same time and installed into the personal computer PC (OP13).

Specifically, the authoring program 101 recorded in the CD-ROM 1 is copied to and recorded as a new authoring program 121 in a hard disk 12 serving as a recording medium built in the personal computer PC or connected to an external unit and the program ID 102 recorded in the CD-ROM 1 is also copied to and recorded in the hard disk 12 as a new program ID 122.

When the program ID 102 recorded in the CD-ROM 1 is copied to the hard disk 12, the inspection information 1020 attached to the program ID 102 is simultaneously recorded in the hard disk 12. However, this is not illustrated in FIG. 1. Moreover, the inspection program 100 recorded in the CD-ROM 1 is simultaneously electrically read from the CD-ROM 1 and recorded in the hard disk 12 as an inspection program 150.

Therefore, the authoring program 121 is provided with a unique ID same as the program ID 102 provided when the program 121 is created. Therefore, when the authoring program 121 is copied from the hard disk 12 to another computer system, the program ID 122 is simultaneously copied. Therefore, by checking the program ID 122 (by reading the program ID 122), it is possible to decide whether the authoring program 121 is illegally copied or not.

Moreover, when the program ID 122 of the authoring program 121 already installed in the personal computer PC, in other words, already recorded in the hard disk 12 is altered, the inspection information 1020 does not correspond to the program ID 122. Therefore, it is detected by the inspection program 150 recorded in the hard disk 12 that the inspection information 1020 does not correspond to the program ID 122. In this case, it is possible to use any one of the processings of forcibly interrupting the operation of the authoring program 121, issuing a warning to the user, and authorizing the use of the authoring program 121 by limiting its functions.

When a conventional CD-ROM is manufactured, a stamp (model) is generally formed from a mother (original) similarly to the case of a music CD and a CD-ROM as a product is mass-copied by the stamp. However, the present invention cannot use the above conventional technique because it is necessary to record a unique ID in each CD-ROM to be electronically readable. Therefore, an authoring program and its unique ID (program ID) are recorded to be electronically readable by using a CD-ROM so-called writable CD-R (Rewritable CD-ROM).

However, a unique ID is not always provided for every authoring program. For example, when using the so-called lot number or version number instead of the unique ID, it is also possible to provide the same program ID for some authoring programs grouped by the conventional programming method.

Figure 3:
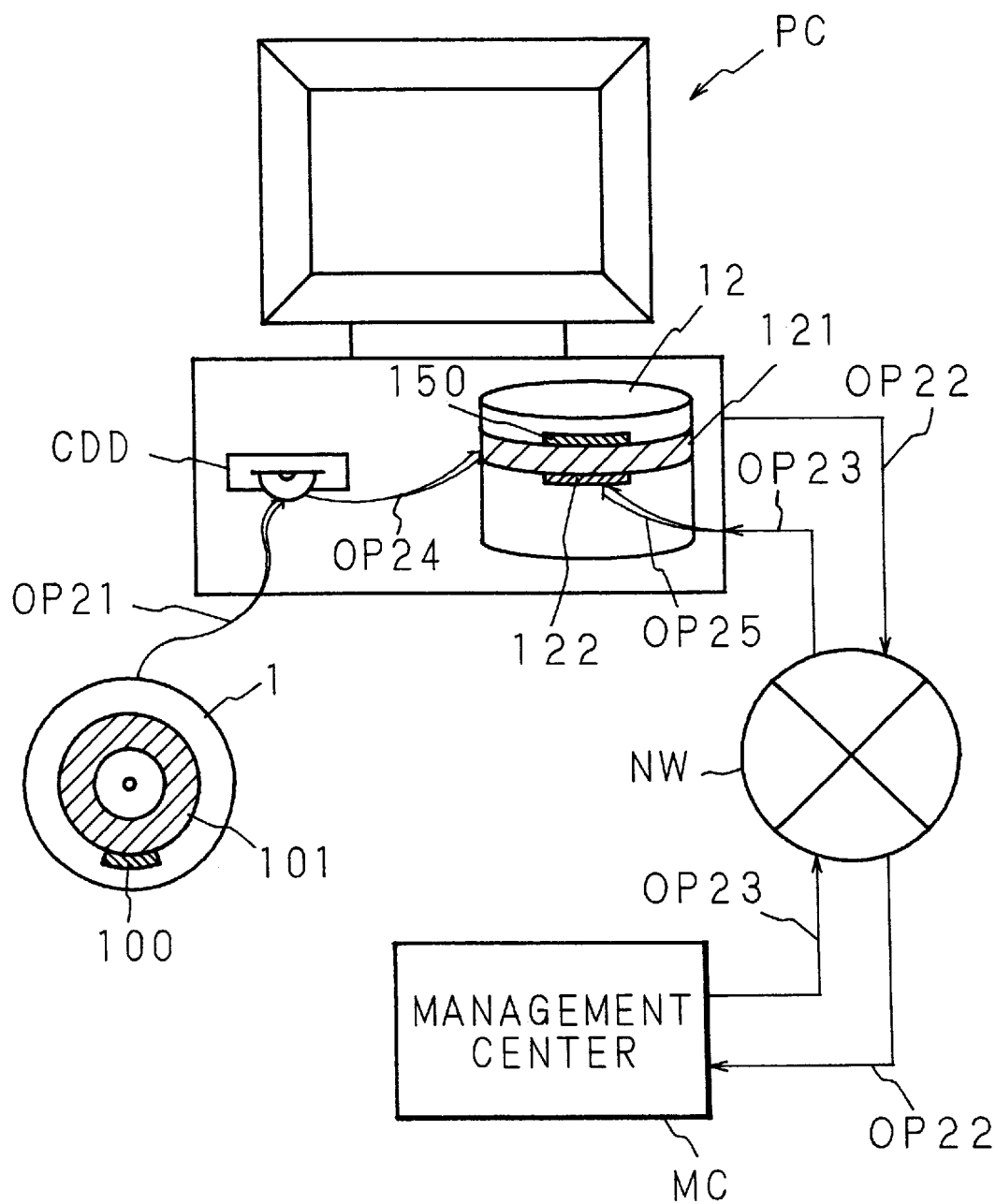
FIG. 3 is a schematic view for explaining the second embodiment of an information management method and recording medium of the present invention.
Figure 4:
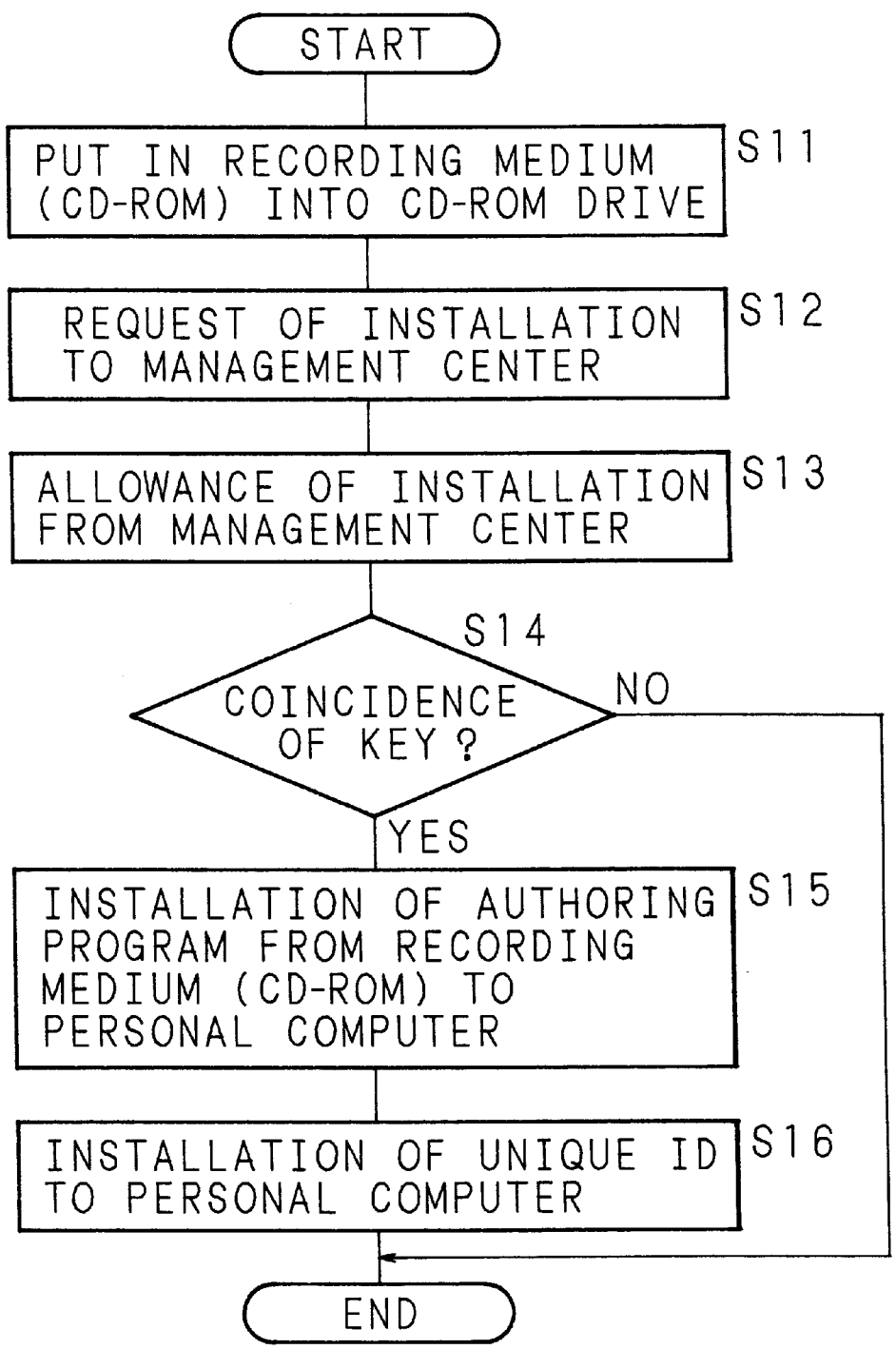
FIG. 4 is a flow chart showing the procedure of an information management method of the present invention.

FIG. 3 is a schematic view for explaining the second embodiment of an information management method and recording medium of the present invention, in which a case of providing a program ID through a network is shown. Moreover, FIG. 4 is a flow chart showing the procedure in the above case.

A user first sets the above conventional CD-ROM 1 to the CD-ROM drive CDD of his or her personal computer PC (step S11, OP21) and thereafter, requests installation to a management center MC through a network NW (step S12, OP22). In response to the request, a key for authorizing the installation of the authoring program 101 into the personal computer PC and a unique ID are transmitted from the management center MC (step S13, OP23) through the network NW.

The personal computer PC contrasts the key given from the management center MC with a key recorded in the CD-ROM 1 (step S14). When the personal computer PC decides that the installation is authorized ("YES" in step S14), the authoring program 101 is installed into the personal computer PC from the CD-ROM 1 (step S15, OP24). In the case of the conventional method, this completes the installation of the authoring program 101. In the case of the present invention, however, a unique ID sent from the management center MC through the network NW is also installed into the personal computer PC as the program ID 122 (step S15, OP25).

Specifically, the authoring program 101 recorded in the CD-ROM 1 is copied to and recorded as the authoring program 121 in the hard disk 12 serving as a recording medium built in the personal computer PC or connected to an external unit. Moreover, the unique ID sent from the management center MC through the network NW is recorded in the hard disk 12 as the unique ID 122.

Figure 2:
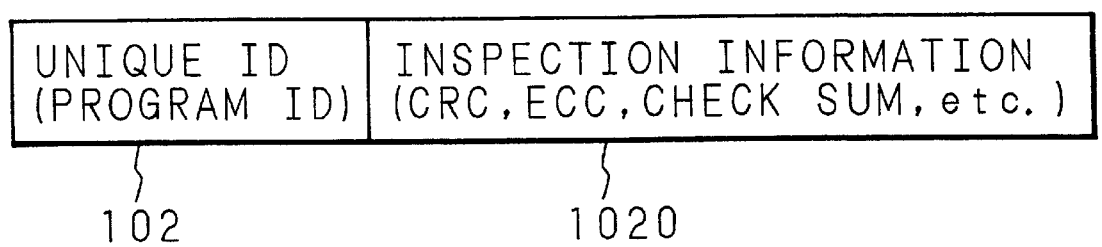
FIG. 2 is a schematic view of inspection information attached to the program ID of an authoring program.

In this case, the facts that the inspection program 100 recorded in the CD-ROM 1 is also recorded in the hard disk 12 as the inspection program 150 and the inspection information 1020 shown in FIG. 2 is attached to the program ID 122 are the same as the case of the first embodiment.

Therefore, because the program ID 122 to which the program ID 102 given from the management center MC is copied is provided for the authoring program 121, the program ID 122 is simultaneously copied when the authoring program 121 is copied to another recording medium. Thus, by detecting the program ID 122, it is clarified who originally owns the authoring program 121, more specifically, to whom the installation of the program 121 is authorized. Therefore, it is possible to decide whether the program 121 is illegally copied or not.

Moreover, even if the program ID 122 of the authoring program 121 already installed in the personal computer PC is altered, it is possible that the inspection program 150 performs the processing same as the case of the first embodiment.

Figure 5:
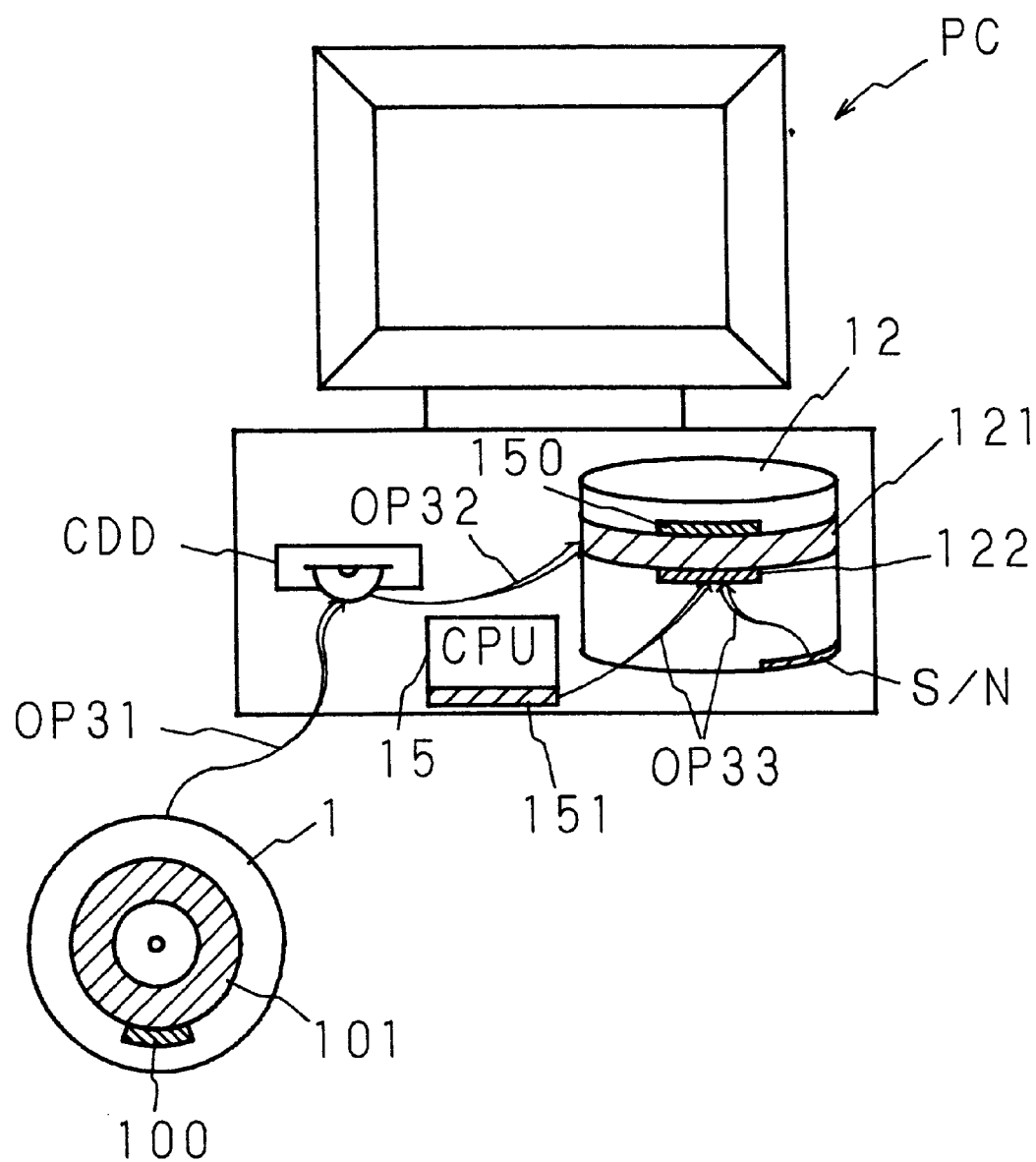
FIG. 5 is a schematic view for explaining the third embodiment of an information management method and recording medium of the present invention.
Figure 6:
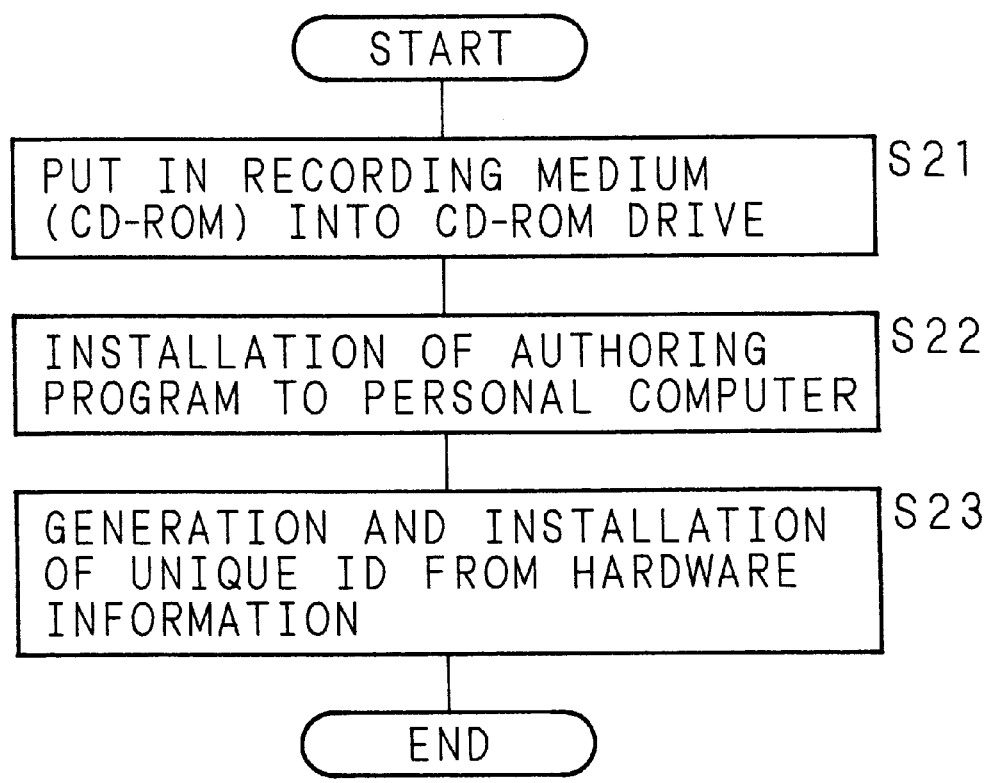
FIG. 6 is a flow chart showing the procedure of an information method of the present invention.

FIG. 5 is a schematic view for explaining the third embodiment of an information management method and recording medium of the present invention, showing a case of providing an intrinsic unique ID (program ID) for hardware, that is, the personal computer PC in which each authoring program is installed. Moreover, FIG. 6 is a flow chart showing the procedure in the above case.

In this case, only the authoring program 101 is recorded in the CD-ROM 1 similarly to the normal case but no program ID is recorded. When a user obtains the above CD-ROM 1 and installs the authoring program 101 in his or her personal computer PC, the authoring program 101 recorded in the CD-ROM 1 to be electronically readable is read by the CD-ROM drive CDD and copied to and recorded in the hard disk 12 as the authoring program 121 (step S31, OP32) by setting the program 101 to the CD-ROM drive CDD (step 21, OP31). In this case, however, a new unique ID is simultaneously generated from the hardware information intrinsic to the personal computer PC and recorded in the hard disk 12 as the program ID 122 (step S32, OP33).

Moreover, in this case, the inspection program 100 recorded in the CD-ROM 1 is also recorded in the hard disk 12 as the inspection program 150 similarly to the case of the first embodiment. Furthermore, the inspection information 1020 is attached to the program ID 122 as shown in FIG. 2, which is newly generated in accordance with the algorithm held by the authoring program 121 when the program ID 122 is newly generated.

In this case, it is possible to use only the unique ID of a CPU, only the serial number of the hard disk 12, or a value obtained by merging the both IDs as the program ID 122. In short, it is possible to use any information intrinsic to hardware constituting the personal computer PC as long as the information can be electronically read by the CPU and electronically written in the hard disk 12 when the authoring program is recorded from the CD-ROM 1 to the hard disk 12.

Specifically, when the hard disk 12 is manufactured, a serial number S/N which can be electronically read is recorded in the disk 12. Moreover, when a CPU 15 is manufactured, a unique ID 151 which can be electronically read is recorded in the CPU 15. Because the serial number S/N of the hard disk 12 and/or the unique ID 151 of the CPU 15 can be electronically read, it is possible to generate a new unique ID (program ID 122) by using them separately or together.

Therefore, because the program ID 122 is provided for the authoring program 121 when the program 121 is installed in accordance with the information intrinsic to the personal computer PC, the program ID 122 is also copied when the authoring program 121 is copied from the hard disk 12 to another computer system. Therefore, by detecting the program ID 122, it is possible to decide whether the authoring program 121 is illegally copied or not.

Moreover, even if the program ID 122 of the authoring program 121 already installed in the personal computer PC is altered, it is possible that the inspection program 150 uses the same processing as the case of the first embodiment.

Figure 7:
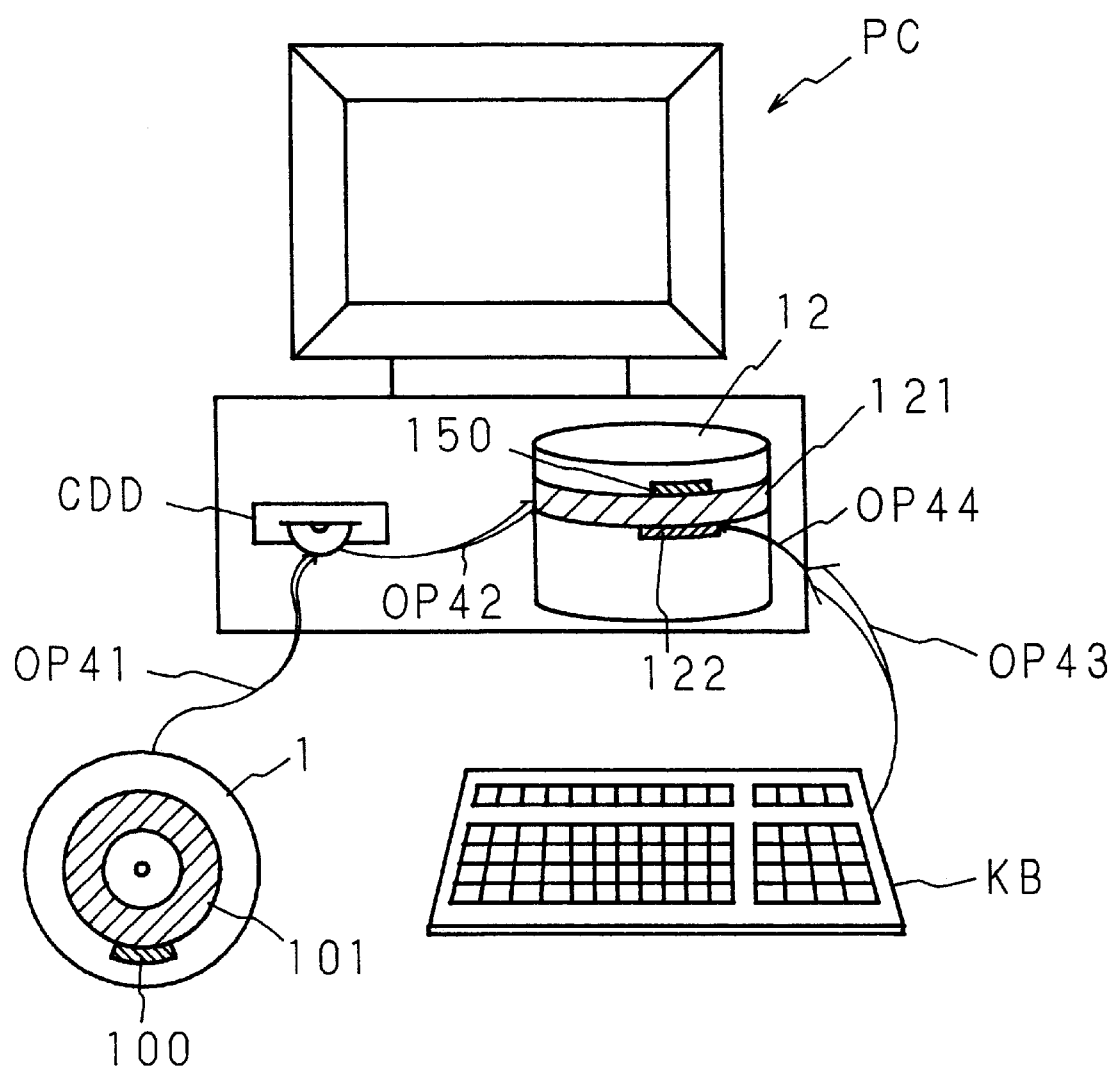
FIG. 7 is a schematic view for explaining the fourth embodiment of an information management method and recording medium of the present invention.
Figure 8:
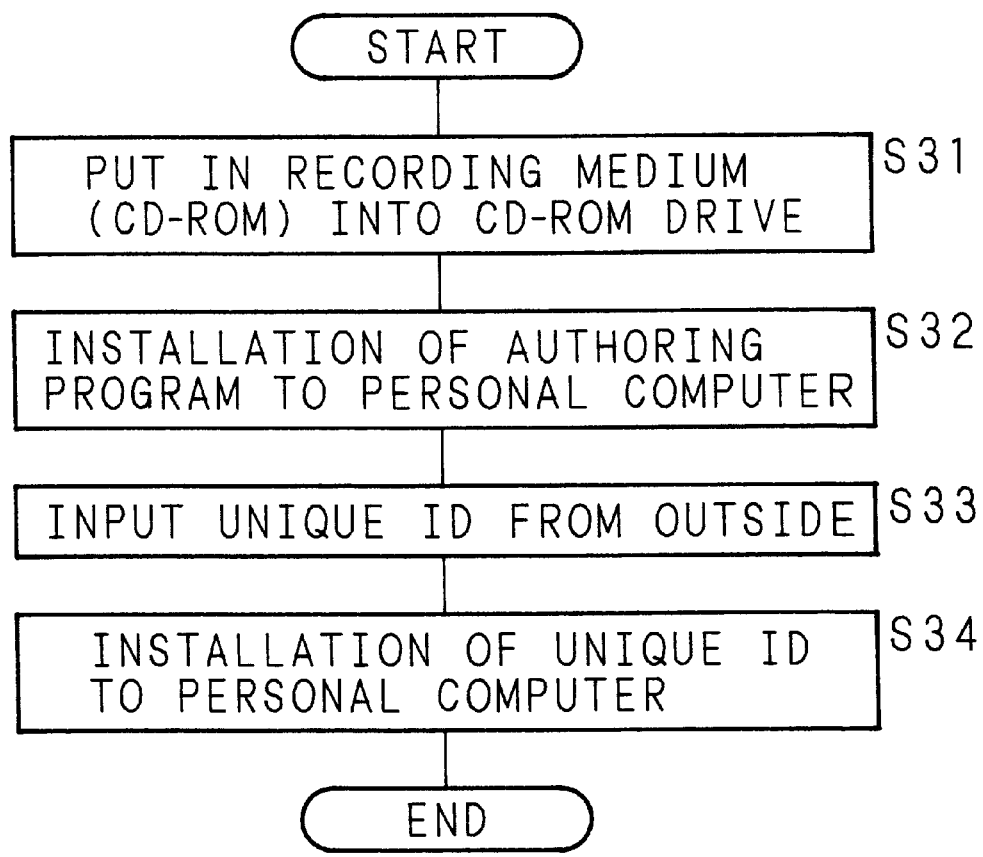
FIG. 8 is a flow chart showing the procedure of an information management method of the present invention.

FIG. 7 is a schematic view for explaining the fourth embodiment of an information management method and recording medium of the present invention, showing a case of artificially providing a unique ID (program ID) for an authoring program by any technique when the authoring program is installed into a computer system such as the personal computer PC. FIG. 8 is a flow chart showing the procedure in the above case.

In this case, only the authoring program 101 is recorded in the CD-ROM 1 similarly to the normal case but no program ID is recorded. When a user obtains the CD-ROM 1 and installs the program 101 in his or her personal computer PC, the authoring program 101 recorded to be electronically readable in the CD-ROM 1 is read by the CD-ROM drive CDD and copied to and recorded in the hard disk 12 as the authoring program 121 (step S32, OP42) by setting the authoring program 101 to the CD-ROM drive CDD (step S31, OP41). In this case, however, setting of a program ID is simultaneously requested for the user of the personal computer PC. In accordance with the request, the user inputs optional information (unique ID) to the personal computer PC by any technique such as key typing through a keyboard KB (step S33, OP43). Thus, the unique ID inputted to the personal computer PC is recorded in the hard disk 12 as the program ID 122 (step S34, OP44).

Moreover, in this case, the inspection program 100 recorded in the CD-ROM 1 is also recorded in the hard disk 12 as the inspection program 150 similarly to the case of the first embodiment. Furthermore, the inspection information 1020 is attached to the program ID 122 as shown in FIG. 2, which is newly generated in accordance with the algorithm held by the authoring program 121 when the program ID 122 is newly generated.

In this case, the program ID can be optionally set by the user or specific information can be designated in, for example, the manual of the authoring program. Moreover, it is possible to input the program ID not only through the keyboard KB but also by designating a numerical value or alphabetical character displayed on a monitor screen by a mouse. Moreover, it is possible that the user inputs the program ID through his or her voices by using a voice recognition art.

Therefore, because the program ID 122 is provided for the authoring program 121 by the user when the program 121 is installed, the program ID 122 is copied simultaneously when the authoring program 121 is copied to another computer system. Therefore, by detecting the program ID 122, it is possible to decide whether the authoring program 122 is illegally copied or not.

As shown above, four types of techniques for providing a program ID for an authoring program are explained. It is needless to say that these techniques can be used separately or by optionally combining them.

In the case of the above embodiments, the authoring program 121 and the program ID 122 are recorded in the hard disk 12 serving as a recording medium. However, as long as a computer system can perform a predetermined processing by starting the authoring program 121, it is possible to use not only the hard disk 12 but also a flexible disk, RAM, flash memory, EEPROM, or reloadable magneto-optic disk. Moreover, these recording media can be statically built in the personal computer PC, can be statically connected to an external unit, or can be removable.

Furthermore, even if the program ID 122 of the authoring program 121 already installed in the personal computer PC is altered, it is possible that the inspection program 150 uses the same processing as the case of the first embodiment.

Furthermore, it is possible to provide a unique ID for file data (hereafter referred to as contents) to be created and/or processed by the above authoring program and stored until it is next processed similarly to the case of the above authoring program, and the unique ID is more important than the authoring program in a sense from the viewpoints of assurance of and prevention of alteration of copyright. A method for providing a unique ID for contents is described below.

Figure 9:
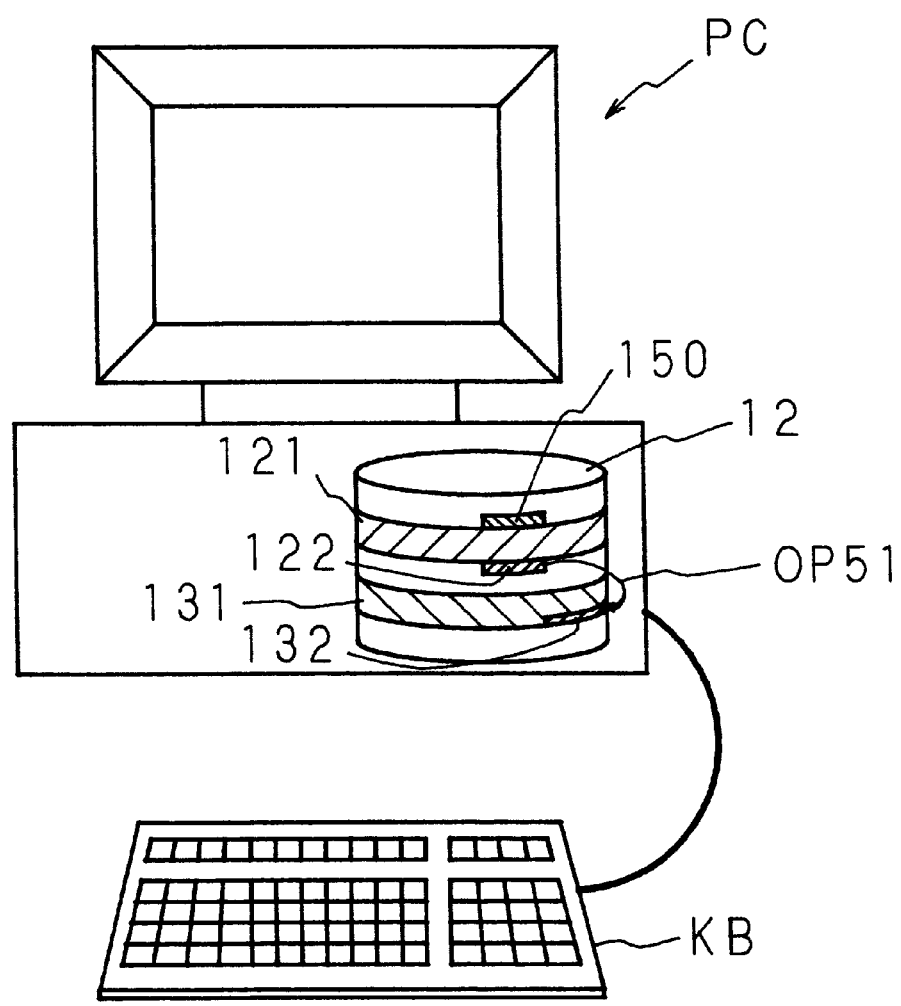
FIG. 9 is a schematic view for explaining the fifth embodiment of an information management method and recording medium of the present invention.

FIG. 9 is a schematic view for explaining the fifth embodiment of an information management method and recording medium of the present invention, showing a case in which a unique ID is also provided for each contents when processing the contents by an authoring program in the personal computer PC serving as a computer system.

The authoring program 121 and the program ID 122 provided for the program 121 are recorded in the hard disk 12 by any one of the above methods of the present invention. When creating new contents 131 by the authoring program 121 in the personal computer PC in the above state and recording the contents 131 in the hard disk 12 or whenever applying any processing to the existing contents 131 already recorded in the hard disk 12, the program ID 122 provided for the authoring program 121 creating or processing the newly created or processed contents 131 is copied to the contents 131 and stored as contents ID 132 (OP51).

Figure 10:
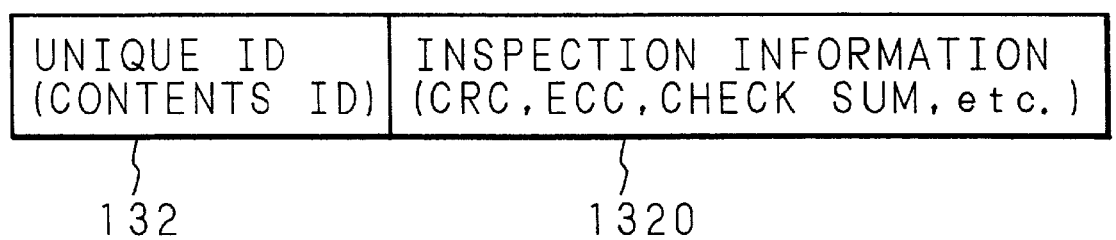
FIG. 10 is a schematic view of inspection information attached to each contents ID.

Though not illustrated in FIG. 9, inspection information 1320 is attached to each contents ID 132 which is the unique ID of the contents 131 as shown by the schematic view in FIG. 10. In the case of the inspection information 1320, the algorithm for generating the information 1320 is held by the manufacturer of the authoring program 121 or the authoring program 121 itself. Therefore, any outsider cannot know the algorithm.

Therefore, the same contents 132 as the program ID 122 of the authoring program 121 which has processed processing the contents 131 is always included in the contents 131. Thus, when another authoring program processes the contents 131, it is possible to recognize the contents ID 132 included in the contents 131. Thereby, when every authoring program whose type is the same as the authoring program 121 is programmed so as to process only contents including each program ID, the contents 131 can be processed by only the authoring program 121 having the program ID 122 same as the contents ID 132 of the contents 131.

Moreover, when the contents ID 132 of the contents 131 already recorded in the hard disk 12 of the personal computer PC is altered, the inspection information 1320 attached to the contents ID 132 does not correspond to the altered contents ID 132. Therefore, it is detected by the inspection program 150 recorded in the hard disk 12 that the inspection information 1320 does not correspond to the contents ID 132. In this case, it is possible to use any one of the processings of forcibly interrupting the operation of the authoring program 121, issuing a warning to the user, and authorizing the use of the authoring program 121 by limiting its functions.

Figure 11:
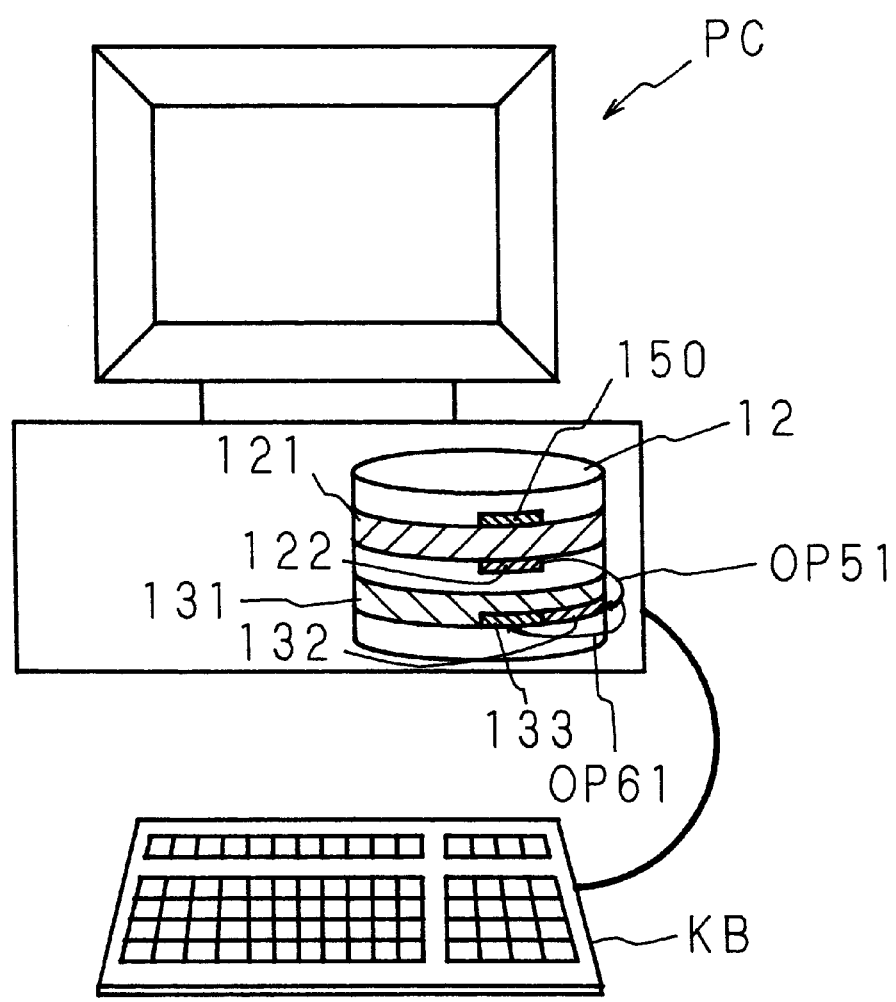
FIG. 11 is a schematic view for explaining the sixth embodiment of an information management method and recording medium of the present invention.

FIG. 11 is a schematic view for explaining the sixth embodiment of an information management method and recording medium of the present invention, showing another case in which a unique ID is also provided for each contents when processing contents by an authoring program in the personal computer PC serving as a computer system.

The authoring program 121 and the program ID 122 provided for the program 121 are recorded in the hard disk 12 by any one of the above described methods of the present invention. When creating new contents 131 by using the authoring program 121 by the personal computer PC in the above state and recording the contents 131 in the hard disk 12, it is the same as the case of the above fifth embodiment that the program ID 122 provided for the authoring program 121 newly creating the contents 131 is copied to the newly-created contents 131 and held as the contents ID 132. Moreover, the authoring program 121 creates a new contents ID 133 dedicated to each contents 131 and holds the ID 133 in the contents 131 (OP61).

In this case, when the authoring program 121 generates the contents ID 133 to be provided for each contents 131, it is possible to use various pieces of information such as date, time, and random number generation.

The above contents 131 always include not only the contents ID 132 same as the program ID 122 of the authoring program 121 which has processed the contents 131 but also the contents 133 for specifying each contents 131. Therefore, when another authoring program processes the contents 131, it is the same as the case of the fifth embodiment shown in FIG. 10 that it is possible to recognize the contents 131. Moreover, it is possible to specify the contents 131 itself. Thereby, similarly to the case of the fifth embodiment shown in FIG. 10, when every authoring program whose type is the same as the authoring program 121 is programmed so as to process only contents including each program ID, the contents 131 can be processed only by the authoring program 121 having the same program ID 122 as the contents ID 132 of the contents 131 and moreover, when the authoring program 121 stores contents IDs provided for all contents created by the program 121, it is possible to identify even the contents 131 created by the authoring program 121 which is copied.

Moreover, even if the contents ID 132 of the contents 131 already recorded in the hard disk 12 of the personal computer PC is altered, it is possible that the inspection program 150 uses the same processing as the case of the fifth embodiment.

Figure 12:
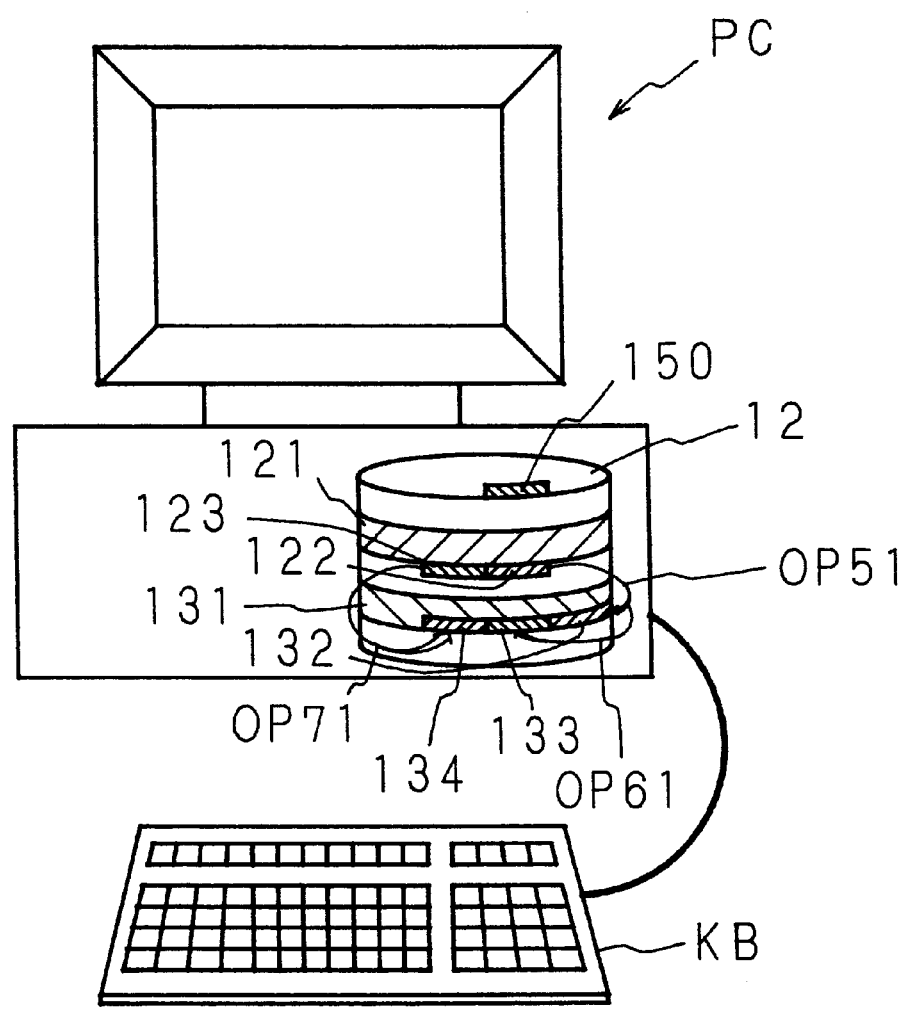
FIG. 12 is a schematic view for explaining the seventh embodiment of an information management method and recording medium of the present invention.

FIG. 12 is a schematic view for explaining the seventh embodiment of an information management method and recording medium of the present invention, showing still another case in which a unique ID (contents ID) is also provided for each contents when processing contents by an authoring program in the personal computer PC serving as a computer system.

The authoring program 121 and the program ID 122 provided for the program 121 are recorded in the hard disk 12. When creating new contents 131 by using the authoring program 121 by the personal computer PC in the above state and recording the contents 131 in the hard disk 12, it is the same as the case of the above fifth embodiment that the program ID 122 provided for the authoring program 121 newly creating the contents 131 is copied to the newly-created contents 131 and held as the contents ID 132 (OP51). Moreover, it is the same as the case of the above-described sixth embodiment shown in FIG. 11 that a new contents ID 133 dedicated to each contents 131 is created by the authoring program 121 and held in the contents 131 (OP61). At the same time, a tool name 123 of the authoring program 121 is newly held in the contents 131 as a contents ID 134 (OP71).

In this case, the technique for the authoring program 121 to create the contents ID 133 to be provided for each contents 131 is the same as the case of the sixth embodiment shown in FIG. 11. Moreover, for the tool name 123 of the contents 131 held by the contents 131, a code showing the type of the contents 131 such as "word processor" or "spread sheet" or a code showing a specific name (trade name) of the contents 131 such as "oasis" or "word" is used.

Therefore, the contents 131 always include not only the contents ID 132 same as the program ID 122 of the authoring program 121 which has processed the contents 131 but also the contents ID 133 for specifying each contents 131 and a specific tool name of the authoring program 121. Therefore, it is the same as the case of the sixth embodiment shown in FIG. 11 that, when another authoring program processes the contents 131, it is possible to recognize the contents 131. Moreover, it is possible to easily specify the type and name of the authoring program which has processed the contents 131.

Furthermore, even if the contents ID 132 of the contents 131 already recorded in the hard disk 12 of the personal computer PC is altered, it is possible that the inspection program 150 uses the same processing as the case of the fifth embodiment.

As described above in detail, according to an information management method and recording medium of the present invention, because each authoring program and contents have a unique identifier (unique ID), if the authoring program or contents is or are copied, the unique ID of the program or contents is naturally copied at the same time. Therefore, it is possible to immediately decide whether the authoring program or contents is or are illegally owned by referring to the unique ID of the authoring program or contents. That is, it is possible to specify the environment in which the authoring program is installed and the environment in which the contents are created referring to the unique ID of the authoring program or the contents. Therefore, by comparing the environment with the present environment, it is possible to decide whether the authoring program or contents is or are illegally obtained or not. Moreover, when unique IDs are changed after an authoring program or contents is or are illegally obtained through copying, the act of copying the authoring program or contents does not make sense because the authoring program cannot be used or an access to the contents cannot be made.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

What is claimed is:

1. An information management method including a recording medium in which a software program for creating and/or processing a file data is recorded, comprising:

reading a unique identifier together with said software program, by a computer, and recording said unique identifier in the recording medium;

when file data is created by said software program, copying the unique identifier provided for said software program to the file data; and providing a newly-generated unique identifier for said file data.

2. The information management method as set forth in claim 1, wherein inspection information according to a predetermined algorithm is attached to said unique identifier, and an inspection program inspecting the identity between a unique identifier provided for the software program and said inspection information is attached in or accompanying said software program.

3. The recording medium as set forth in claim 1, wherein inspection information according to a predetermined algorithm is attached to said unique identifier, and an inspection program inspecting the identity between a unique identifier provided for the software program and said inspection information is attached in or accompanying said software program.

4. The information management method as set forth in claim 1, wherein the unique identifier provided for said software program is copied to the file data when said file data is created by said software program or existing file data is processed.

5. The information management method as set forth in claim 4, wherein inspection information according to a predetermined algorithm is attached to a unique identifier provided for said file data, and an inspection program inspecting the identity between the unique identifier provided for said file data and said inspection information is attached in or accompanying the software program which creates and/or processes said file data.

6. The information management method as set forth in claim 1, wherein the unique identifier provided for file data by said software program includes a type and/or name of said software program.

7. The information management method as set forth in claim 1, wherein an inspection information according to a predetermined algorithm is attached to a unique identifier provided for said file data, and further, an inspection program for inspecting the identity between the unique identifier provided for said file data and said inspection information is attached in or accompanying the software program which creates and/or processes said file data.

8. A computer readable recording medium in which a software program creating and/or processing a file data is recorded, comprising:
reading a unique identifier together with said software program, by a computer, and recording said unique identifier in the recording medium;
when file data is created by said software program,
copying the unique identifier provided for said software program to the file data; and
providing a newly-generated unique identifier for said file data.

9. An information management method, comprising:
installing, to a computer system, a software program which can be installed into said computer system when an authorization is given to said computer system by an on-line connected management center and creates and/or processes a file data;
generating a unique identifier by said management center so as to be read together with said software program that is installed to said computer system; and
providing a newly generated unique identifier for said file data.

10. The information management method as set forth in claim 9, wherein an inspection information according to a predetermined algorithm is attached to said unique identifier, and inspection program inspecting the identity between a unique identifier provided for a software program and said inspection information is attached in or accompanying said software program.

11. The recording medium as set forth in claim 9, wherein inspection information according to a predetermined algorithm is attached to said unique identifier, and an inspection program inspecting identity between a unique identifier provided for the software program and said inspection information is attached in or accompanying said software program.

12. The information management method as set forth in claim 9, wherein the unique identifier provided for said software program is copied to the file data when said file data is created by said software program or existing file data is processed.

13. The information management method as set forth in claim 12, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

14. The information management method as set forth in claim 9, wherein, when a file data is created by said software program, a unique identifier provided for said software program is copied to the file data, and a newly-generated unique identifier is provided for said file data.

15. The information management method as set forth in claim 14, wherein the unique identifier provided for a file data by said software program includes a type and/or name of said software program.

16. The information management method as set forth in claim 14, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

17. A computer readable recording medium in which a software program for creating and/or processing a file data is recorded, comprising:
installing the software program into a computer system by providing an authorization to said computer system from an on-line connected management center;
generating a unique identifier by said management center;
recording the unique identifier with said software program; and
providing a newly generated unique identifier for said file data.

18. An information management method, comprising:
installing a software program into a computer system by providing an authorization to said computer system from an on-line connected management center;
generating a unique identifier in accordance with information intrinsic to said computer system;
recording the unique identifier with the software program; and
providing a newly generated identifier for file data associated with the software program.

19. The information management method as set forth in claim 18, wherein an inspection information according to a predetermined algorithm is attached to said unique identifier, and an inspection program for inspecting the identity between a unique identifier provided for a software program and said inspection information is attached in or accompanying said software program.

20. The recording medium as set forth in claim 18, wherein an inspection information according to a predetermined algorithm is attached to said unique identifier, and an inspection program inspecting the identity between a unique identifier provided for a software program and said inspection information is attached in or accompanying said software program.

21. The information management method as set forth in claim 18, wherein the unique identifier provided for said software program is copied to the file data when said file data is created by said software program or existing file data is processed.

22. The information management method as set forth in claim 21, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

23. The information management method as set forth in claim 18, wherein, when a file data is created by said software program, a unique identifier provided for said software program is copied to the file data, and a newly-generated unique identifier is provided for said file data.

24. The information management method as set forth in claim 23, wherein the unique identifier provided for a file data by said software program includes a type and/or name of said software program.

25. The information management method as set forth in claim 23, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

26. A computer readable recording medium in which a software program for creating and/or processing a file data is recorded, comprising:
    installing said software program into a computer system;
    generating a unique identifier in accordance with information intrinsic to said computer system;
    storing the unique identifier along with the software program; and
    providing a newly generated unique identifier for the file data.

27. An information management method installing a software program creating and/or processing a file data, comprising:
    installing optional information into said computer system, the input received external to said computer system;
    recording the optional information as a unique identifier to be read together with said software program; and
    providing a newly generated unique identifier for the file data.

28. The information management method as set forth in claim 27, wherein said identifier is generated in accordance with the information previously provided for one or a plurality of hardware constituting said computer system.

29. The information management method as set forth in claim 28, wherein said hardware used to generate said identifier comprises a CPU and/or a hard disk.

30. The information management method as set forth in claim 27, wherein an inspection information according to a predetermined algorithm is attached to said unique identifier, and an inspection program inspecting the identity between a unique identifier provided for a software program and said inspection information is attached in or accompanying said software program.

31. The recording medium as set forth in claim 27, wherein an inspection information according to a predetermined algorithm is attached to said unique identifier, and an inspection program inspecting the identity between a unique identifier provided for a software program and said inspection information is attached in or accompanying said software program.

32. The information management method as set forth in claim 27, wherein the unique identifier provided for said software program is copied to the file data when said file data is created by said software program or existing file data is processed.

33. The information management method as set forth in claim 32, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

34. The information management method as set forth in claim 27, wherein, when a file data is created by said software program, a unique identifier provided for said software program is copied to the file data, and a newly-generated unique identifier is provided for said file data.

35. The information management method as set forth in claim 34, wherein the unique identifier provided for a file data by said software program includes the type and/or name of said software program.

36. The information management method as set forth in claim 34, wherein an inspection information according to a predetermined algorithm is attached to a unique identifier provided for said file data, and an inspection program inspecting the identity between the unique identifier provided for said file data and said inspection information is attached in or accompanying the software program which creates and/or processes said file data.

37. A computer readable recording medium in which a software program creating and/or processing a file data is recorded by installing said software program into a computer system, comprising:
    inputting optional information to said computer system, the input received external to said computer system;
    recording the optional information as a unique identifier to be read together with said software program and
    providing a newly generated unique identifier for the file data.

38. The information management method as set forth in claim 37, wherein said identifier is generated in accordance with information previously provided for one or a plurality of hardware constituting said computer system.

39. The information management method as set forth in claim 38, wherein said hardware used to generate said identifier comprises a CPU and/or a hard disk.

40. An information management method comprising:
    reading a software program containing a first unique identifier;
    generating a second unique identifier based on the target computer environment;
    creating identifier data containing both the first and second unique identifiers;
    installing files embedded with the identifier data; and
    before allowing access to the installed files, verifying a current environment by using the identifier data.

41. A computer readable storage media storing an information management method, comprising:

reading a software program containing a first unique identifier;

generating a second unique identifier based on the target computer environment;

creating identifier data containing both the first and second unique identifiers;

installing files embedded with the identifier data; and before allowing access to the installed files, verifying a current environment by using the identifier data.

42. A method for identifying files created by a program, comprising:

storing a unique identifier with the program;

whenever a file is created by the program, performing the following 3 lines:

storing the unique identifier with the file;

assigning a unique number to the file;

storing the unique number with the file; and identifying the file by using both the unique identifier and the unique number.

43. The method as recited in claim 42, further comprising:

attaching inspection information to the unique identifier according to a predetermined algorithm; and verifying the authenticity of the file based on the inspection information and the unique identifier.

44. A computer readable storage medium storing a process for identifying files created by a program, comprising:

storing a unique identifier with the program;

whenever a file is created by the program, performing the following 3 lines:

storing the unique identifier with the file;

assigning a unique number to the file;

storing the unique number with the file; and identifying the file by using both the unique identifier and the unique number.

45. The computer readable storage medium as recited in claim 44, further comprising:

attaching inspection information to the unique identifier according to a predetermined algorithm; and verifying the authenticity of the file based on the inspection information and the unique identifier.

* * * * *